US011915337B2

(12) United States Patent
Kramer et al.

(10) Patent No.: US 11,915,337 B2
(45) Date of Patent: Feb. 27, 2024

(54) SINGLE PASS DOWNSAMPLER

(71) Applicant: Advanced Micro Devices, Inc., Santa Clara, CA (US)

(72) Inventors: Lou Isabelle Kramer, Munich (DE); Matthäus G. Chajdas, Munich (DE)

(73) Assignee: Advanced Micro Devices, Inc., Santa Clara, CA (US)

( * ) Notice: Subject to any disclaimer, the term of this patent is extended or adjusted under 35 U.S.C. 154(b) by 41 days.

(21) Appl. No.: 17/182,952

(22) Filed: Feb. 23, 2021

(65) Prior Publication Data

US 2021/0287325 A1    Sep. 16, 2021

Related U.S. Application Data

(60) Provisional application No. 62/989,206, filed on Mar. 13, 2020.

(51) Int. Cl.
*G06T 1/20*    (2006.01)
*G06F 9/48*    (2006.01)
(Continued)

(52) U.S. Cl.
CPC .............. *G06T 1/20* (2013.01); *G06F 9/4881* (2013.01); *G06T 3/40* (2013.01); *G06T 15/04* (2013.01)

(58) Field of Classification Search
None
See application file for complete search history.

(56) References Cited

U.S. PATENT DOCUMENTS 5,274,754 A    12/1993  Sfarti
5,495,563 A *   2/1996  Winser .................... G06T 15/50
                                                 345/582

(Continued)

FOREIGN PATENT DOCUMENTS

JP    2004088251 A    3/2004

OTHER PUBLICATIONS

Sander, "AMD GCN Assembly: Cross-Lane Operations", Aug. 10, 2016, "https://gpuopen.com/learn/amd-gcn-assembly-cross-lane-operations/", pp. 1-14 (Year: 2016).*

(Continued)

*Primary Examiner* — Kent W Chang
*Assistant Examiner* — Jonathan M Cofino
(74) *Attorney, Agent, or Firm* — Kowert, Hood, Munyon, Rankin & Goetzel, P.C.; Rory D. Rankin

(57) ABSTRACT

Systems, apparatuses, and methods for implementing a downsampler in a single compute shader pass are disclosed. A central processing unit (CPU) issues a single-pass compute shader kernel to perform downsampling of a texture on a graphics processing unit (GPU). The GPU includes a plurality of compute units for executing thread groups of the kernel. Each thread group fetches a patch of the texture, and each individual thread downsamples four quads of texels to compute mip levels 1 and 2 independently of the other threads. For mip level 3, texel data is written back over one of the local data share (LDS) entries from which the texel data was loaded. This eliminates the need for a barrier between loads and stores for computing mip level 3. The remaining mip levels are computed in a similar fashion by the thread groups of the single-pass kernel.

20 Claims, 16 Drawing Sheets

(51) Int. Cl.
*G06T 3/40* (2006.01)
*G06T 15/04* (2011.01)

(56) References Cited

U.S. PATENT DOCUMENTS

| | | | |
|---|---|---|---|
| 5,818,456 | A | 10/1998 | Cosman et al. |
| 5,870,509 | A * | 2/1999 | Alcorn .................... G06T 15/04 |
| | | | 382/293 |
| 6,339,426 | B1 | 1/2002 | Lui et al. |
| 6,525,723 | B1 | 2/2003 | Deering |
| 7,456,846 | B1 | 11/2008 | King et al. |
| 7,684,641 | B1 | 3/2010 | Toksvig |
| 7,916,155 | B1 | 3/2011 | Moreton |
| 8,269,788 | B2 | 9/2012 | Tuomi |
| 8,345,063 | B2 | 1/2013 | Iourcha et al. |
| 8,928,690 | B2 | 1/2015 | Brennan |
| 9,019,299 | B2 | 4/2015 | Iourcha et al. |
| 10,152,772 | B2 | 12/2018 | Fainstain |
| 2001/0030655 | A1 | 10/2001 | Anwar |
| 2002/0093520 | A1 | 7/2002 | Larson |
| 2003/0043169 | A1 | 3/2003 | Hunter |
| 2003/0095134 | A1 | 5/2003 | Tuomi et al. |
| 2003/0206179 | A1 | 11/2003 | Deering |
| 2003/0206663 | A1 | 11/2003 | Daly |
| 2003/0210251 | A1 | 11/2003 | Brown |
| 2005/0062767 | A1 | 3/2005 | Choe et al. |
| 2006/0061592 | A1 | 3/2006 | Akenine-Moller et al. |
| 2006/0087518 | A1 | 4/2006 | Ameline et al. |
| 2007/0052718 | A1 * | 3/2007 | McKellar ................ G06T 15/04 |
| | | | 345/582 |
| 2007/0257935 | A1 | 11/2007 | Koduri et al. |
| 2008/0012878 | A1 | 1/2008 | Nystad et al. |
| 2008/0303841 | A1 * | 12/2008 | Newhall, Jr. ........... G06T 15/04 |
| | | | 345/587 |
| 2009/0046108 | A1 | 2/2009 | Brown Elliott et al. |
| 2009/0129664 | A1 | 5/2009 | Tsuchiya et al. |
| 2009/0167778 | A1 | 7/2009 | Wei |
| 2009/0195552 | A1 | 8/2009 | Nystad |
| 2009/0240931 | A1 * | 9/2009 | Coon ..................... G06F 9/3885 |
| | | | 712/234 |
| 2009/0256848 | A1 | 10/2009 | Iourcha et al. |
| 2010/0002000 | A1 | 1/2010 | Everitt et al. |
| 2010/0246692 | A1 | 9/2010 | Rusanovskyy et al. |
| 2010/0316254 | A1 * | 12/2010 | Kirsch ................. G06V 10/751 |
| | | | 382/103 |
| 2011/0142366 | A1 | 6/2011 | Young |
| 2011/0150331 | A1 | 6/2011 | Young |
| 2011/0249011 | A1 | 10/2011 | Lalonde et al. |
| 2011/0274175 | A1 | 11/2011 | Sumitomo |
| 2012/0127331 | A1 | 5/2012 | Grycewicz |
| 2013/0222442 | A1 | 8/2013 | Gu et al. |
| 2013/0249927 | A1 | 9/2013 | Brennan |
| 2014/0118352 | A1 | 5/2014 | Hakura et al. |
| 2014/0176541 | A1 | 6/2014 | Surti et al. |
| 2014/0267232 | A1 | 9/2014 | Lum et al. |
| 2014/0327696 | A1 | 11/2014 | Pomianowski et al. |
| 2015/0070381 | A1 | 3/2015 | Lum et al. |
| 2015/0193968 | A1 | 7/2015 | Barringer et al. |
| 2015/0311265 | A1 | 10/2015 | Matsueda et al. |
| 2016/0035129 | A1 | 2/2016 | Bolz et al. |
| 2016/0057420 | A1 | 2/2016 | Pang et al. |
| 2016/0203578 | A1 | 7/2016 | Shoshan et al. |
| 2016/0212332 | A1 | 7/2016 | Tang et al. |
| 2016/0366386 | A1 | 12/2016 | Douady-Pleven et al. |
| 2016/0379403 | A1 | 12/2016 | Seiler |
| 2017/0132833 | A1 | 5/2017 | Sathe |
| 2017/0206638 | A1 | 7/2017 | Fainstain |
| 2018/0158227 | A1 * | 6/2018 | Reshetov ................... G06T 7/13 |
| 2019/0066370 | A1 * | 2/2019 | Schmalstieg .......... G06T 11/001 |
| 2020/0027260 | A1 * | 1/2020 | Harris ..................... G06T 11/00 |
| 2020/0034214 | A1 * | 1/2020 | Vanco .................. G06F 9/5005 |

OTHER PUBLICATIONS

International Search Report and Written Opinion in International Application No. PCT/US17/13786, dated Apr. 4, 2017, 13 pages.
Non-Final Office Action in U.S. Appl. No. 15/408,054, dated Oct. 10, 2017, 11 pages.
Final Office Action in U.S. Appl. No. 15/408,054, dated Mar. 21, 2018, 11 pages.
Non-Final Office Action in U.S. Appl. No. 15/408,054, dated Jul. 26, 2018, 14 pages.

* cited by examiner

SINGLE PASS DOWNSAMPLER

CROSS REFERENCE TO RELATED APPLICATIONS

This application claims priority to the U.S. Provisional Patent Application Ser. No. 62/989,206, entitled "Single Pass Downsampler", filed Mar. 13, 2020, the entirety of which is incorporated herein by reference.

BACKGROUND

Description of the Related Art

Graphics processing units (GPUs) and other multi-threaded processing units typically include multiple processing elements (which are also referred to as processor cores, compute units, or execution units) that concurrently execute multiple instances of a single program on multiple data sets. The instances are referred to as threads or work-items, and groups of threads or work-items are created (or spawned) and then dispatched to each processing element. The processing unit can include hundreds of processing elements so that thousands of threads are concurrently executing programs. In a multithreaded GPU, the threads execute different instances of a kernel to perform calculations in parallel.

In many applications executed by a GPU, a sequence of threads are processed so as to output a final result. A thread is one of a collection of parallel executions of a kernel invoked on a compute unit. A thread is distinguished from other executions within the collection by a global ID and a local ID. A subset of threads in a thread group that execute simultaneously together on a compute unit can be referred to as a wavefront, warp, or vector. The width of a wavefront is a characteristic of the hardware of the compute unit. As used herein, the term "compute unit" is defined as a collection of processing elements (e.g., single-instruction, multiple-data (SIMD) units) that perform synchronous execution of a plurality of threads. The number of processing elements per compute unit can vary from implementation to implementation. A "compute unit" can also include a local data store (LDS) and any number of other execution units such as a vector memory unit, a scalar unit, a branch unit, and so on. Also, as used herein, a collection of cooperating wavefronts are referred to as a "workgroup" or "thread group".

Texture mapping is a technique in which a detailed texture is applied to a surface of a virtual object. As the distance of the virtual object from the camera varies from scene to scene, the resolution of a texture applied to the object likewise will vary. To account for these variations, texture maps in a mipmap structure (i.e., a mipmap) can be generated to improve a rendering speed of the graphics pipeline. The mipmap is a collection of bitmap images of a texture with successively reduced resolutions. In other words, the mipmap contains multiple versions of the same texture, with each version at a different resolution. These different versions can be referred to as "mipmap levels", "levels", or "mips". By using a low-resolution mipmap level image when an object is further from the camera, fewer texture elements need to be loaded when rendering the object. These texture elements are also referred to as "texels", with a "texel" defined as a discrete element which is the smallest unit of a texture. A "texel" of a texture is analogous to a "pixel" of a digital image.

A common approach to generating mipmap levels for a texture on a GPU is by using a pixel shader, one pass per mip. The limitations and bottlenecks of a pixel shader approach include barriers between the mips and data exchange between the mips via global memory. This increases the latency and power consumption when computing mipmap levels for a texture.

BRIEF DESCRIPTION OF THE DRAWINGS

The advantages of the methods and mechanisms described herein may be better understood by referring to the following description in conjunction with the accompanying drawings, in which:

FIG. 9 illustrates diagrams of one implementation of active threads through various stages of mip level computation.

FIG. 10 illustrates examples of thread activity patterns for computing mip level 3.

DETAILED DESCRIPTION OF IMPLEMENTATIONS

Figure 1:
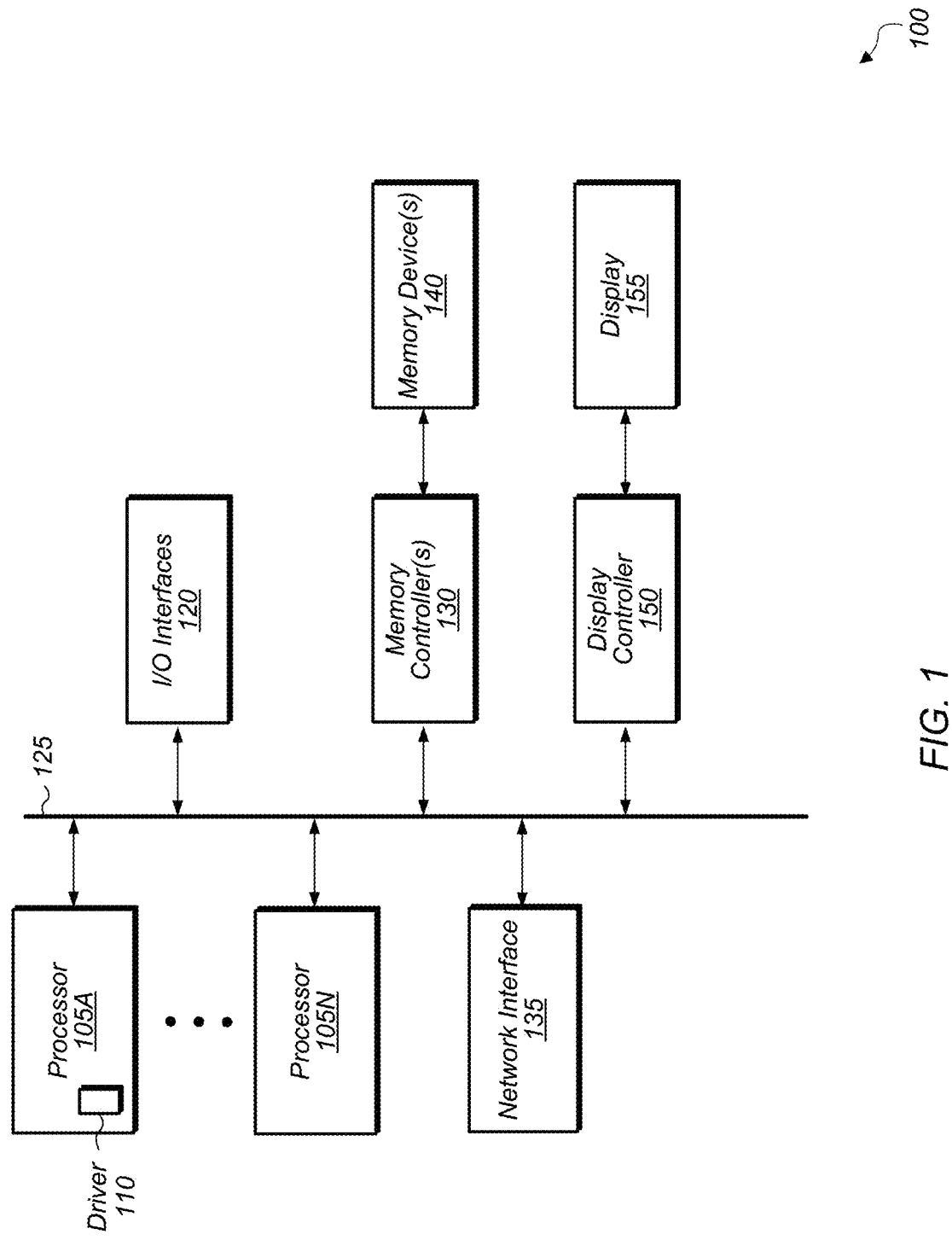
FIG. 1 is a block diagram of one implementation of a computing system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing a single-pass downsampler are disclosed herein. In one implementation, a first processor (e.g., central processing unit (CPU)) dispatches a single kernel to perform downsampling of a texture on a second processor (e.g., graphics processing unit (GPU)). In one implementation, the second processor includes a plurality of compute units for executing thread groups of the kernel. Each thread group fetches a patch (i.e., portion) of the texture, and each individual thread downsamples four quads of texels to compute mip levels 1 and 2 independently of the other threads. For mip level 3, texel data is written back over one of the local data share (LDS) entries from which the texel data was loaded. This eliminates the need for a barrier between loads and stores for computing mip level 3. The remaining mip levels are computed in a similar fashion by the thread groups of the single kernel.

In one implementation, thread indices for the threads fetching a texture are generated based on how the texture is laid out in memory. For example, if the texture is stored in memory in the standard texture layout, then the thread indices are generated using a Morton ordering pattern. The Morton ordering pattern can be used to improve the cache hit rate. As used herein, the term "standard texture layout" is defined as interleaving the x and y texel coordinate bits when generating a linear address for storing a texture in memory. It is noted that the term "standard texture layout" can also be referred to as "standard swizzle".

In one implementation, each thread loads four 2×2 quads of texels from the texture to compute mip level 1. In one implementation, each thread group loads a block of 32×32 texels and uses the LDS and potentially quad swizzle instructions to compute mip level 2. In one implementation, each thread group computes a patch of size 16×16 for mip level 2. A barrier is issued after the threads store the values to the LDS to ensure that all threads have finished the store operations before these values are loaded by subsequent threads. Then, after the barrier, the threads load texels from the LDS in a quad-like access pattern—meaning each thread is loading one quad (i.e., a 2×2 block of texels).

Referring now to FIG. 1, a block diagram of one implementation of a computing system 100 is shown. In one implementation, computing system 100 includes at least processors 105A-N, interfaces (e.g., input/output (I/O) interfaces 120, bus 125, memory controller(s) 130, network interface 135), memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105A executes a driver 110 (e.g., graphics driver) for communicating with and/or controlling the operation of one or more of the other processors in system 100. It is noted that depending on the implementation, driver 110 can be implemented using any suitable combination of hardware, software, and/or firmware. In one implementation, processor 105N is a data parallel processor with a highly parallel architecture, such as a graphics processing unit (GPU) which renders pixels for display controller 150 to drive to display 155.

A GPU is a complex integrated circuit that performs graphics-processing tasks. For example, a GPU executes graphics-processing tasks required by an end-user application, such as a video-game application. GPUs are also increasingly being used to perform other tasks which are unrelated to graphics. The GPU can be a discrete device or can be included in the same device as another processor, such as a CPU. Other data parallel processors that can be included in system 100 include digital signal processors (DSPs), field programmable gate arrays (FPGAs), application specific integrated circuits (ASICs), and so forth. In some implementations, processors 105A-N include multiple data parallel processors.

Memory controller(s) 130 are representative of any number and type of memory controllers accessible by processors 105A-N. While memory controller(s) 130 are shown as being separate from processors 105A-N, it should be understood that this merely represents one possible implementation. In other implementations, a memory controller 130 can be embedded within one or more of processors 105A-N and/or a memory controller 130 can be located on the same semiconductor die as one or more of processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, and so forth. Network interface 135 is able to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
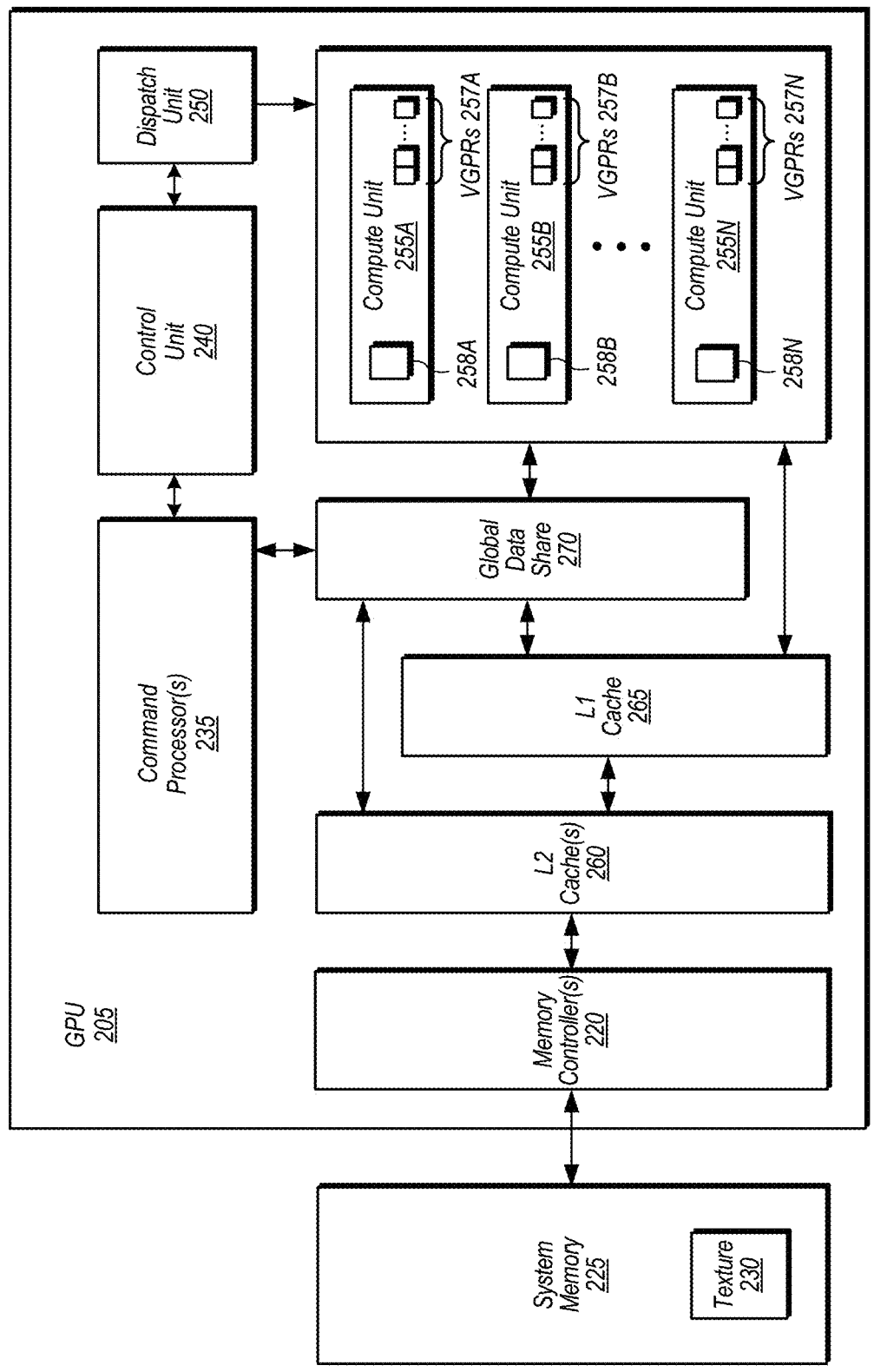
FIG. 2 is a block diagram of another implementation of a computing system.

Turning now to FIG. 2, a block diagram of another implementation of a computing system 200 is shown. In one implementation, system 200 includes at least GPU 205 and system memory 225. System 200 can also include other components which are not shown to avoid obscuring the figure. GPU 205 includes at least command processor(s) 235, control unit 240, dispatch unit 250, compute units 255A-N, memory controller(s) 220, global data share 270, level one (L1) cache 265, and level two (L2) cache(s) 260. In various embodiments, compute units 255 includes an interface(s) configured access local and/or external memory that stores data (e.g., source image texture data, etc.). In other implementations, GPU 205 includes other components, omits one or more of the illustrated components, has multiple instances of a component even if only one instance is shown in FIG. 2, and/or is organized in other suitable manners. In one implementation, the circuitry of GPU 205 is included in processor 105N (of FIG. 1).

In various implementations, computing system 200 executes any of various types of software applications. As part of executing a given software application, a host CPU (not shown) of computing system 200 launches work to be performed on GPU 205. In one implementation, command processor 235 receives kernels from the host CPU, and command processor 235 uses dispatch unit 250 to issue corresponding wavefronts to compute units 255A-N. In one implementation, a wavefront launched on a given compute unit 255A-N includes a plurality of work-items executing on the single-instruction, multiple-data (SIMD) units of the given compute unit 255A-N. Wavefronts executing on compute units 255A-N can access vector general purpose registers (VGPRs) 257A-N and a corresponding local data share (LDS) 258A-N located on compute units 255A-N. It is noted that VGPRs 257A-N are representative of any number of VGPRs.

In one implementation, GPU 205 executes a single-pass compute shader downsampling kernel to downsample a source image texture 230 stored in system memory 225. The downsampling kernel is executed in a single compute shader pass to generate all of the mipmap levels for the source image texture 230 rather than performing a separate pass for each mipmap level. This helps to reduce the latency and power consumption associated with downsampling texture 230. It is noted that the terms "mipmap" and "mip" can be used interchangeably herein. Also, the terms "mipmap level" and "mip level" can also be used interchangeably herein. Additional details on the single-pass compute shader downsampling kernel will be provided throughout the remainder of this disclosure.

Figure 3:
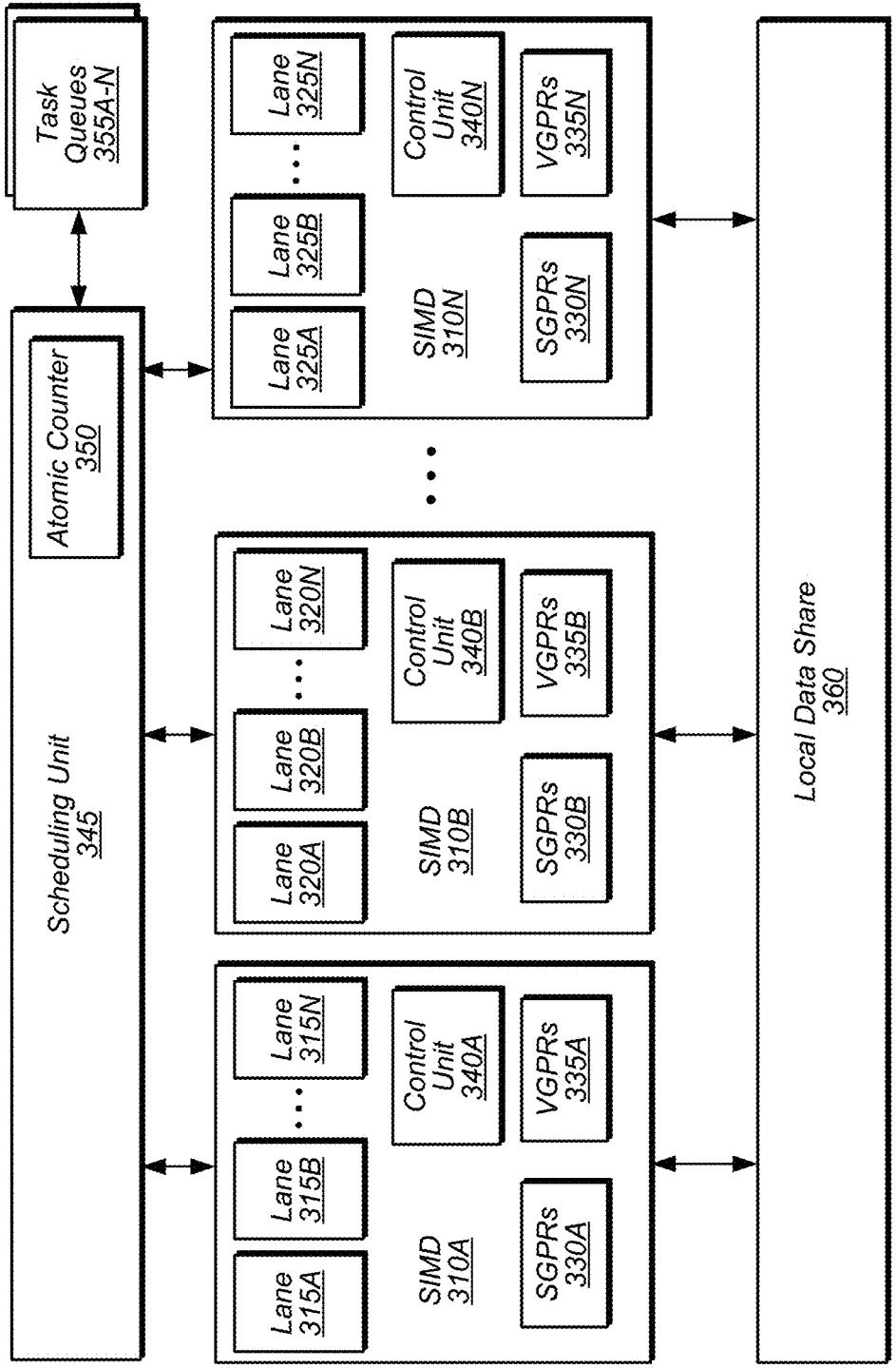
FIG. 3 is a block diagram of one implementation of a compute unit.

Referring now to FIG. 3, a block diagram of one implementation of a compute unit 300 is shown. In one implementation, compute unit 300 includes at least SIMDs 310A-N, scheduling unit 345, atomic counter 350, task queues 355A-N, and local data share (LDS) 360. It is noted that compute unit 300 can also include other components (e.g., texture load/store units, cache, texture filter units, branch and message unit, scalar unit, instruction buffer) which are not shown in FIG. 3 to avoid obscuring the figure. In one implementation, each of compute units 255A-N (of FIG. 2) includes the circuitry of compute unit 300.

When a data-parallel kernel is dispatched by the system to compute unit 300, corresponding tasks are enqueued in task queues 355A-N. Work-items (i.e., threads) of the kernel executing the same instructions are grouped into a fixed sized batch called a wavefront to execute on compute unit 300. Multiple wavefronts can execute concurrently on compute unit 300. The instructions of the threads of the wavefronts are stored in an instruction buffer (not shown) and scheduled for execution on SIMDs 310A-N by scheduling unit 345. When the wavefronts are scheduled for execution on SIMDs 310A-N, corresponding threads execute on the individual lanes 315A-N, 320A-N, and 325A-N in SIMDs 310A-N. Each lane 315A-N, 320A-N, and 325A-N of SIMDs 310A-N can also be referred to as an "execution unit" or an "execution lane".

In one implementation, compute unit 300 receives a plurality of instructions for a wavefront with a number N of threads, where N is a positive integer which varies from processor to processor. When threads execute on SIMDs 310A-N, the instructions executed by threads can include store and load operations to/from scalar general purpose registers (SGPRs) 330A-N, VGPRs 335A-N, and LDS 360. Control units 340A-N in SIMDs 310A-N are representative of any number of control units which can be located in any suitable location(s) within compute unit 300. Control units 340A-N can be implemented using any suitable combination of circuitry and/or program instructions.

In one implementation, a single-pass compute shader downsampling kernel is launched on compute unit 300. The kernel is partitioned into multiple thread groups, with each thread group including a plurality of threads. Each thread groups downsamples a separate patch of an input source texture in one scenario. In this scenario, each thread group downsamples a corresponding patch independently of the other thread groups downsampling their patch. When a thread group finishes downsampling the corresponding patch, atomic counter 350 is incremented. When atomic counter 350 reaches a threshold indicating that only one thread group remains unfinished, this last remaining thread group continues the downsampling process to generate the remaining mips for the texture. In one implementation, the texels of the various mip levels are stored in LDS 360 where they are then transferred to global memory (not shown) or another location for longer term storage. When a new mip level is being computed, the texel values from the previous mip level are loaded from LDS 360 and used to compute new texel values for the new mip level. In another implementation, the texels of the various mip levels are stored directly in global memory. In other words, the downsampling is performed directly in the global memory rather than in LDS 360 in this particular implementation.

Figure 4:
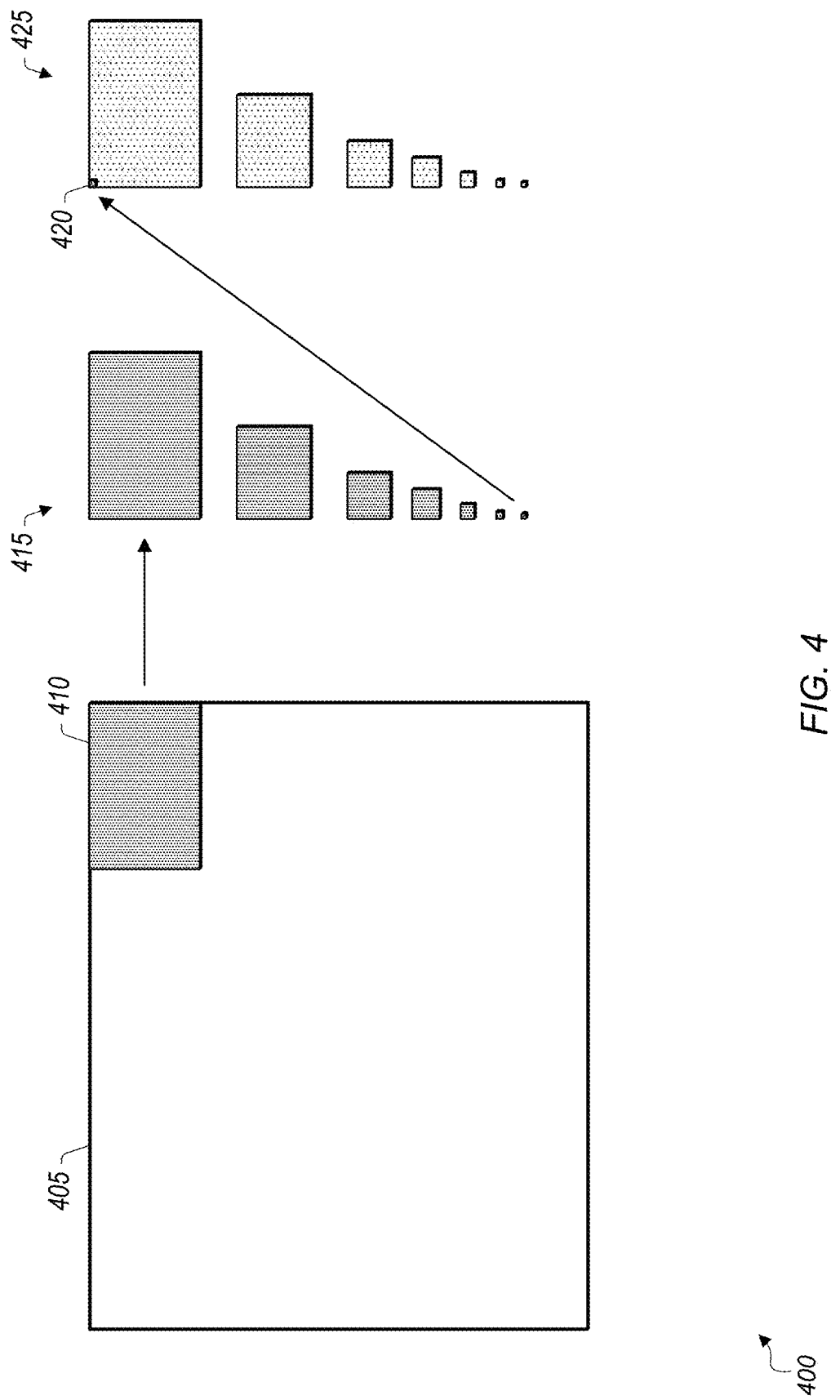
FIG. 4 is a diagram of one implementation of mipmap generation.

Turning now to FIG. 4, a diagram illustrating mipmap generation 400 in accordance with one implementation is shown. In one implementation, a source image texture 405 is processed to generate a series of mipmap levels of progressively lower resolution. For example, in one implementation, a patch 410 of source image texture 405 is processed to generate smaller, lower resolution versions as shown in progression 415. It is noted that the other portions of source image texture 405 can be processed in a similar manner.

After the mipmap levels are calculated as shown in progression 415, the intermediate mipmap level with portion 420 is downsampled further in progression 425 until the final mipmap level is computed. For example, in a simple case, if a source image texture is 64×64 texels (a typical texture would likely be much larger), a first mipmap level of 32×32 texels could be computed by averaging every 2×2 quad of pixels. Then, a second mipmap level of 16×16 texels would be computed, a third mipmap level of 8×8 texels would be computed, and so on. The final mipmap level would be a single downsampled texel. Other sizes of source image textures would follow this pattern.

Figure 5:
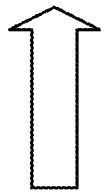
FIG. 5 is a diagram of one implementation of generating thread indices using a Morton ordering pattern so as to process an 8×8 patch.

Referring now to FIG. 5, a diagram of generating thread indices using a Morton ordering pattern so as to process an 8×8 patch is shown. Patch 500 on the left-side of FIG. 5 represents a portion of a source image texture with the texels numbered according to a row-major ordering scheme. As used herein, the term "patch" is defined as a portion of a texture. In this example, patch 500 is an 8×8 texel block. In other examples, other patch sizes can be used. The threads that are generated to downsample patch 500 can be numbered in the same fashion as the row-major ordering scheme. However, this reduces the efficiency of the downsampling process because the threads will not have texels for performing multiple levels of downsampling.

Accordingly, another ordering scheme is a Morton ordering scheme as shown in patch 505 on the right-side of FIG. 5. In patch 505, the texels are numbered in a Morton ordering pattern so that each quad of pixels has consecutive indices. When threads load the texel values, the threads can load texel values by following the Morton-like numbering scheme, allowing each thread to compute multiple mipmap levels without having to fetch additional texel values. For example, if a first thread fetches texel values 0-15, then the first thread can compute mipmap level values for the first four quads in the top-left corner of patch 505. Next, the first thread can compute a mipmap level 2 texel value for the top-left corner of patch 505 by averaging the four mipmap level 1 texel values. The other threads can work in a similar fashion. This results in a more efficient downsampling process as compared to threads operating on texels ordered according to the row-major numbering scheme shown for patch 500.

Figure 6:
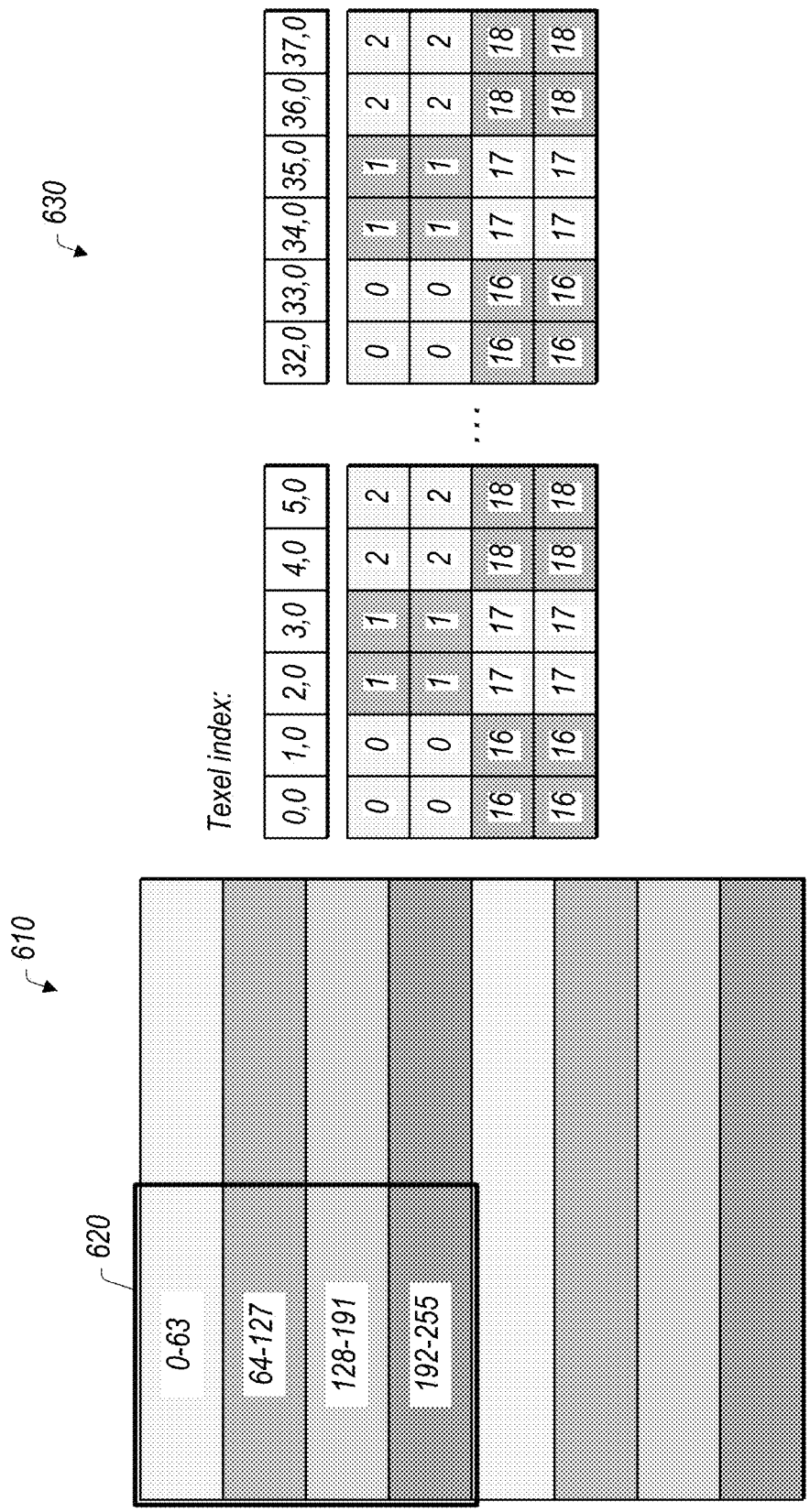
FIG. 6 is a diagram of one implementation of a mapping of thread indices to texel indices.

Turning now to FIG. 6, a diagram of one implementation of a mapping of thread indices to texel indices is shown. Grid 610 is a representation of the threads that are generated for downsampling a source image texture. Portion 620 includes a threadgroup of 256 threads which are split into subsets of 64 threads. The mapping of the threads to texel indices is shown on the right-side of FIG. 6 in grid 630. For example, in one implementation, each thread is mapped to a quad of texels, with thread 0 mapped to a first quad of texels in the upper-left portion of texel grid 630, with thread 1 mapped to a second quad of texels to the right of the first quad, and so on. This allows each thread to compute the next mip level, without exchanging data with other threads, by averaging the quad of texels down to a single texel. In one implementation, each thread is mapped to four quads which are interspersed throughout texel grid 630. In other implementations, each thread can be mapped to other numbers of texels in the source image texture.

Figure 7:
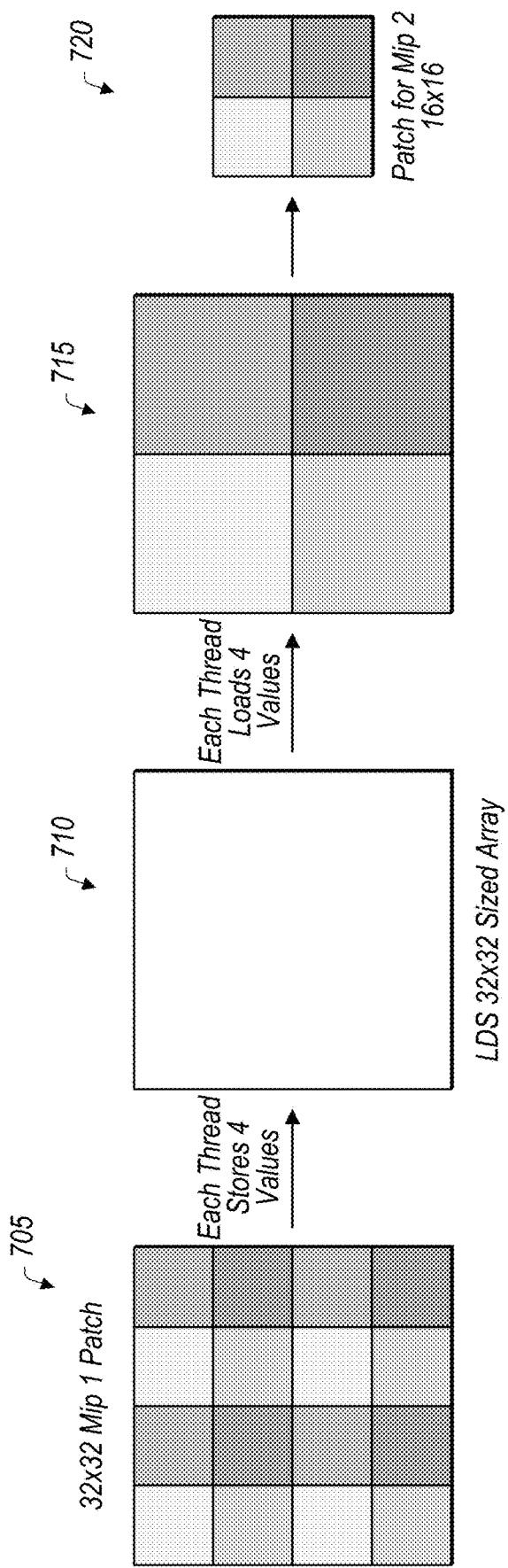
FIG. 7 is a diagram of one implementation of computing mip level 2 values.

Referring now to FIG. 7, a diagram of one implementation of computing mip level 2 values is shown. In one implementation, a plurality of threads are mapped to mip level 1 texel values of a texture as shown in diagram 705. In this example, there are 16 threads mapped to the mip level 1 texel values, with each thread fetching a quad of mip level 1 texel values. Each thread stores 4 values to the LDS 710, which is a 32×32 sized array in one implementation. Then, each thread loads 4 values in the pattern shown in grid 715 which has four separate quadrangles within the patch. Each thread reduces the 4 values down to a single value. The result of this step is the generation of a 16×16 mip 2 patch 720.

Figure 8:
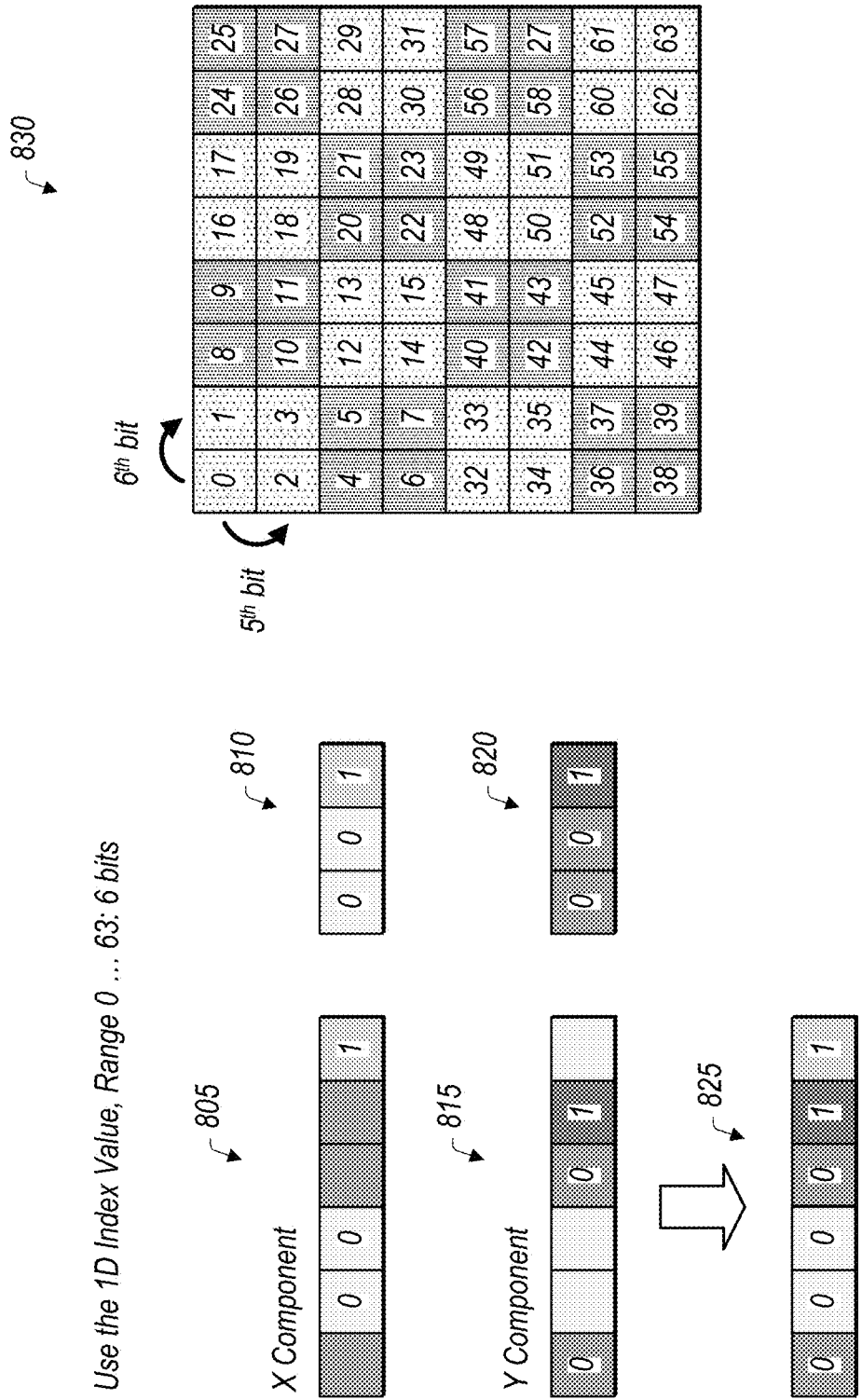
FIG. 8 is a diagram of one implementation of using Morton ordering for mapping thread indices to texel values.

Turning now to FIG. 8, a diagram of one implementation of using Morton ordering for mapping thread indices to texel values is shown. An example grid 830 of texel values for an 8×8 block of texels is shown on the right-side of FIG. 8. The texels of grid 830 are labeled with the thread ID which maps to that texel using Morton ordering. One example of generating the thread IDs using Morton ordering is shown on the left-side of FIG. 8. In this example, the X component 805 and Y component 815 are shown for the texel value at coordinates (1,1). The X coordinate 810 and the Y coordinate 820 are shown to the right of X component 805 and Y component 815, respectively. The bits, from low to high, of X coordinate 810 map to the $2^{nd}$, $3^{rd}$, and $6^{th}$ bits of X component 805, and the bits, from low to high, of Y coordinate 820 map to the $1^{st}$, $4^{th}$, and $5^{th}$ bits of Y component 815. The actual thread ID value 825 is the combination of X component 805 and Y component 815. For example, to determine the actual thread ID value 825, a bitwise OR-operation is performed between X component 805 and Y component 815.

While the actual thread ID value 825 of "0b000011" is shown for the coordinates (1,1) of texel grid 830, other thread ID values can be calculated in a similar manner for other coordinates of texel grid 830. In another example, the coordinates (4,6) will be used to illustrate the procedure for generating the Morton-like thread ID for this texel location on grid 830. The coordinates (4,6) refer to the texel location which is 4 texels away from the left-most texel and 6 texels away from the top-most texel of grid 830. The X coordinate value for the texel at coordinates (4,6) is 0b100. The Y coordinate value for the texel at coordinates (4,6) is 0b110. The corresponding X component and Y component values would be 0b010000 and 0b100100, respectively. This would generate an actual thread ID value of 0b110100, or 52 in decimal. Thread IDs for other texel locations can be calculated in a similar manner.

Figure 9:
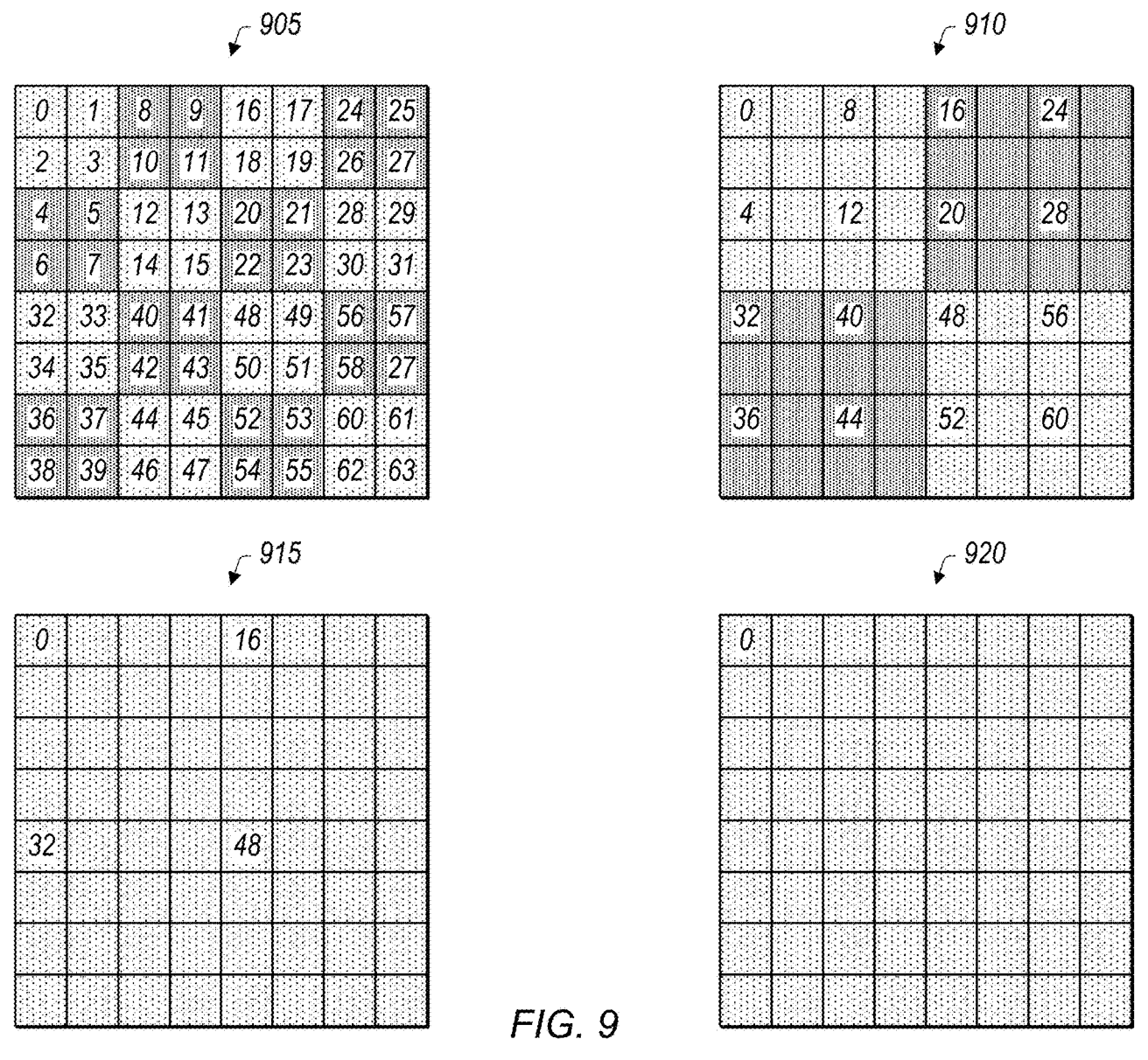

Referring now to FIG. 9, diagrams of active threads through various stages of mip level computation in accordance with one implementation is shown. On the top-left of FIG. 9, texel map 905 is shown with labels showing the Morton ordering for assigning texels to threads. In one implementation, each thread fetches a separate quad of texels, with thread 0 fetching texels labeled 0-3, thread 1 fetching texels 4-7, and so on. Each quad of texels in map 905 is shaded with a different pattern to illustrate that each quad is processed by a different thread. After fetching a quad of texels, each thread computes an average texel value which represents the quad in the next mip level. In another implementation, each thread fetches four quads of texels, with thread 0 fetching texels labeled 0-15, thread 1 fetching texels labeled 16-31, and so on. Other implementations can use other techniques for assigning texels to threads.

Texel map 910 illustrates the downsampled texels that remain after the first mip calculation. Each fourth thread then fetches the four downsampled texels for four contiguous quads, and then each fourth thread computes the average of these four texels which becomes the value for the next mip level.

Texel map 915 illustrates the result of the processing of texel map 910, with four texel values remaining. These four texel values can then be processed by a single thread to compute a single value for the entire 8×8 block. This mip level is illustrated by texel map 920. It is noted that other 8×8 blocks of the source image texture can be processed in a similar manner, and then additional mip levels can be calculated in the same fashion by having every fourth thread calculate the next mip level. This process can continue until the last remaining mip level is computed. It is noted that while the lowest thread ID is described as computing the next mip level for each quad of pixels, this is merely representative of one implementation. In another implementation, the highest thread ID can compute the resultant value for the next mip level for every set of four threads. Alternatively, the second lowest thread ID or the second highest thread ID can be chosen in other implementations.

Figure 10:
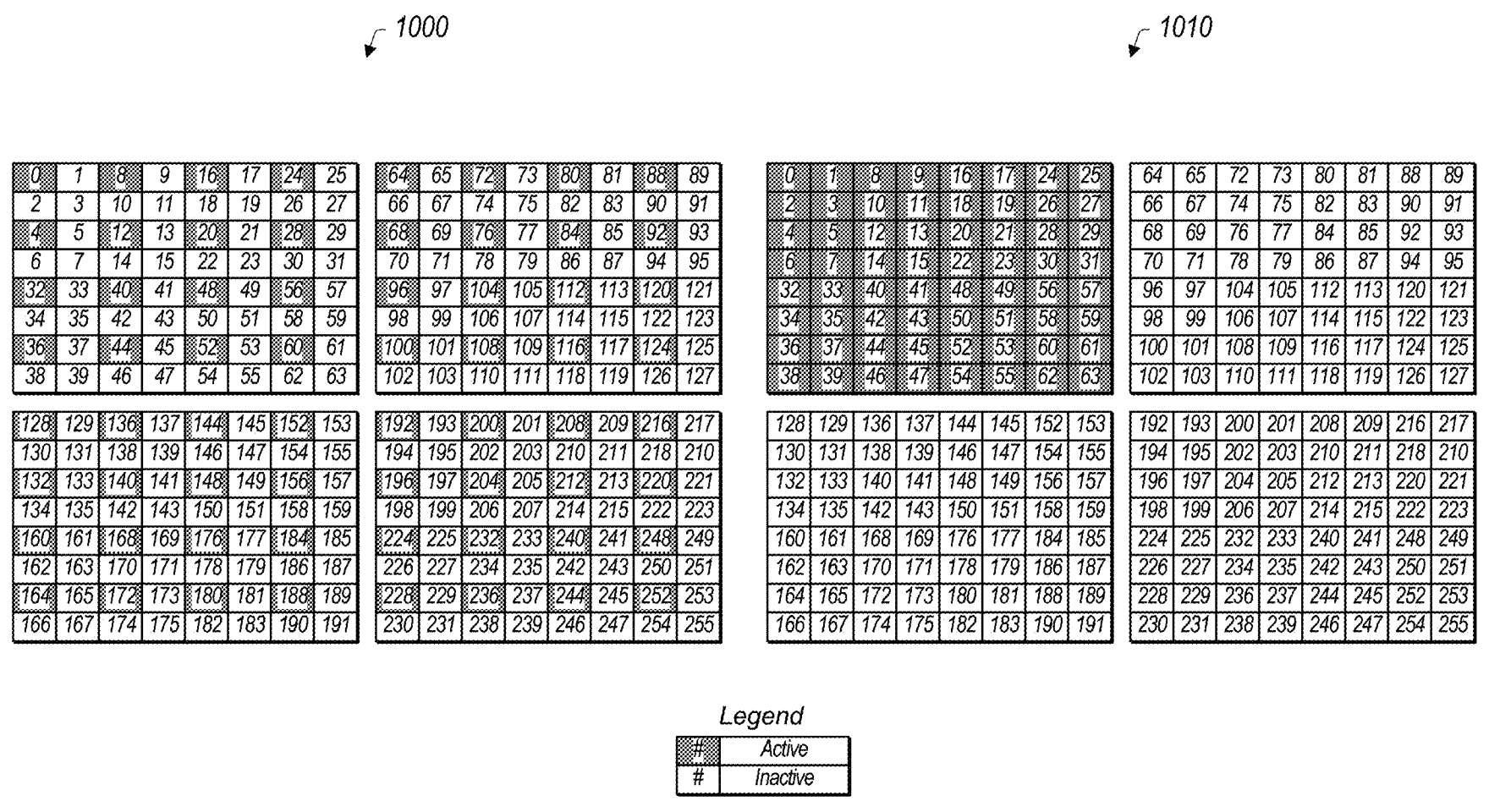

Turning now to FIG. 10, examples of thread activity patterns for computing mip level 3 are shown. In one implementation, when transitioning from computing mip level 2 to computing mip level 3, three of every four threads can be made inactive. In other words, every fourth thread can remain active when computing mip level 3. This is due to the reduced size of mip level 3. A naïve way of computing mip level 3 is shown on the left-side of FIG. 10 with thread activity pattern 1000. Thread activity pattern 1000 assumes there are 256 threads issued for computing mip level 2 for a given patch or texture. In this example, every fourth thread remains active with three of each group of four threads becoming inactive. The active threads, shown as the gray-shaded blocks, are spread throughout the 256 threads as shown in thread activity pattern 1000. One disadvantage of this approach is that there is no possibility of skipping wavefront instruction issues.

Another scheme for computing mip level 3 is illustrated with thread activity pattern 1010. In this scheme, the lowest 64 threads remain active while the upper 192 threads become inactive. Calculating mip level 3 with active threads matching thread activity pattern 1010 allows for three wavefront instruction issues to be skipped for the upper 192 threads, based on the assumption that a wavefront size is equal to 64 threads. Accordingly, mip level 3 can be computed in a more efficient manner using this approach. In other implementations with other wavefronts sizes, other similar thread activity schemes can be employed to take advantage of this technique of grouping active threads together into one or more wavefronts and grouping inactive threads into one or more wavefronts.

Figure 11:
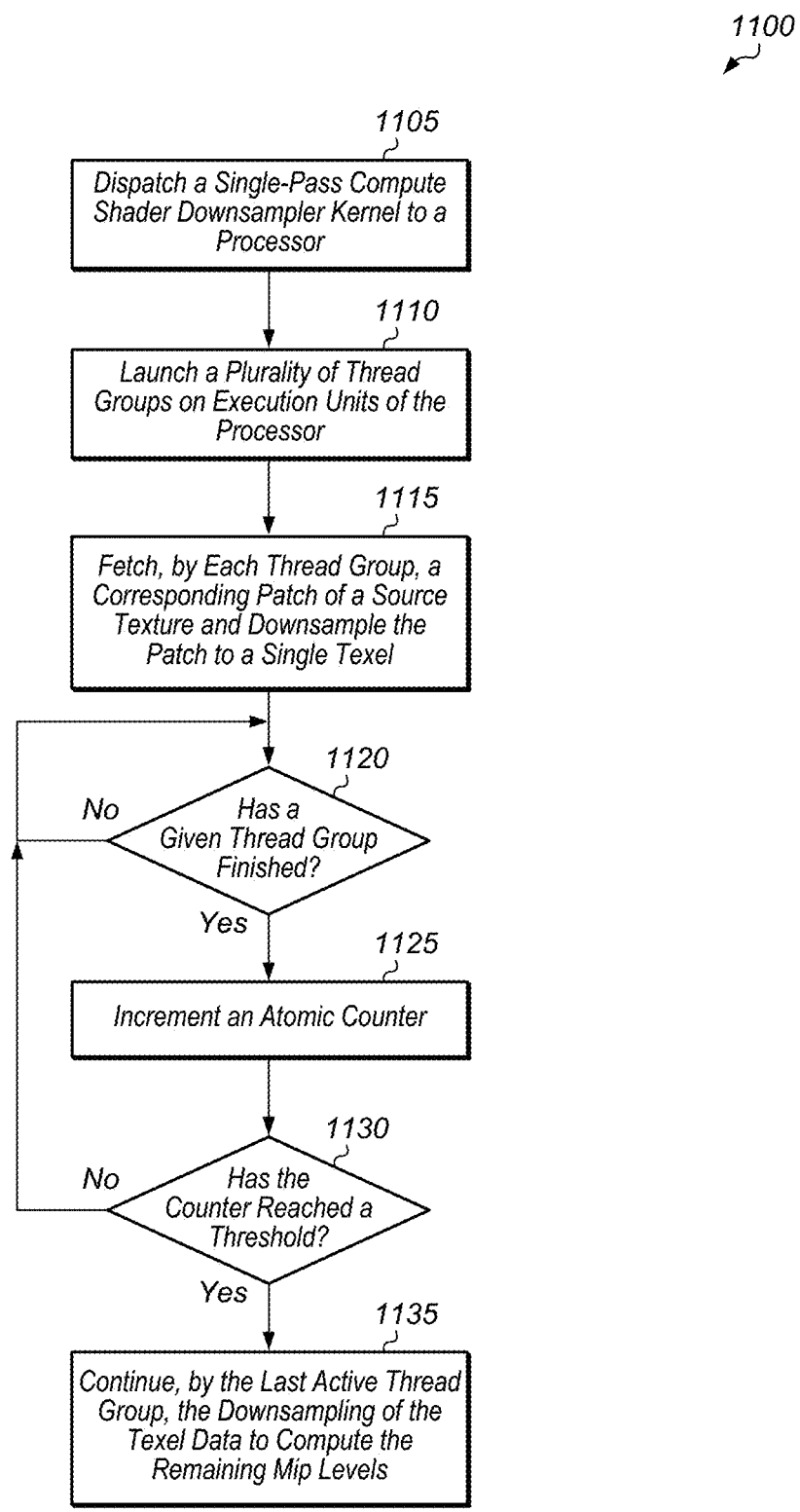
FIG. 11 is a generalized flow diagram illustrating one implementation of a method for executing a single-pass downsampler.

Referring now to FIG. 11, one implementation of a method 1100 for executing a single-pass downsampler is shown. For purposes of discussion, the steps in this implementation and those of FIG. 12-16 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 1100 (and methods 1200-1600).

A single-pass compute shader downsampler kernel is dispatched to a processor (e.g., GPU 205 of FIG. 2) (block 1105). The processor executes the kernel to launch a plurality of thread groups on execution units of the processor (block 1110). Each thread group fetches a corresponding patch of a source texture and downsamples the patch to a single texel (block 1115). The size of the patch can vary from implementation to implementation. For example, in one implementation, a patch is 64×64 texels while in other implementation, the patch has other numbers of texels.

When a given thread group finishes (conditional block 1120, "yes" leg), an atomic counter is incremented (block 1125). If the atomic counter reaches a threshold (conditional block 1130, "yes" leg), then the last active thread group continues the downsampling of the texel data to compute the remaining mip levels (block 1135). After block 1135, method 1100 ends. In one implementation, the threshold is one less than the number of thread groups. For example, if 256 thread groups are launched, then the threshold would be 255 in this scenario. Performing method 1100 allows for all of the mip levels to be computed in a single compute shader pass.

Figure 12:
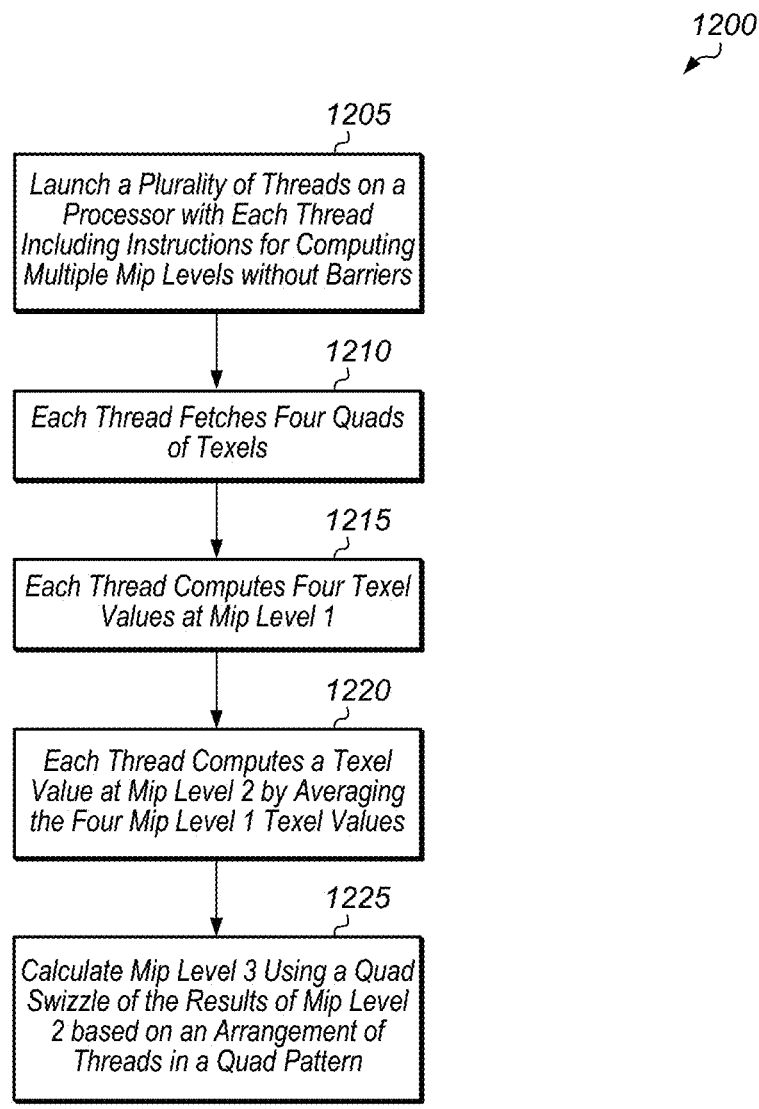
FIG. 12 is a generalized flow diagram illustrating one implementation of a method for individual threads computing multiple mip levels.

Referring now to FIG. 12, one implementation of a method 1200 for individual threads computing multiple mip levels is shown. A plurality of threads are launched on a processor with each thread including instructions for computing multiple mip levels without barriers (block 1205). For instance, in one implementation, each thread includes instructions for computing mip levels 1 and 2. After being launched on the processor, each thread fetches four quads of texels (block 1210). Each quad is a 2×2 block of contiguous texels. Next, each thread computes four texel values at mip level 1 (block 1215). In one implementation, each texel value is computed by calculating an average of a corresponding quad of texels. In other implementations, other reduction operations can be performed to compute a single mip level 1 texel value to represent a quad of mip level 0 texels.

Then, after computing the four texel values of mip level 1, each thread computes a texel value at mip level 2 by averaging the four mip level 1 texel values (block 1220). It is noted that no inter-thread communication is needed to perform blocks 1215 and 1220 since each thread can perform these steps independently of the other threads. Next, mip level 3 is calculated using a quad swizzle of the results of mip level 2 based on an arrangement of threads in a quad pattern (block 1225). In another implementation, mip level 3 texels are calculated by loading mip level 2 texel values from the LDS. After block 1225, method 1200 ends. It is noted that a subset or the entirety of the existing threads can compute the remaining mip levels.

Figure 13:
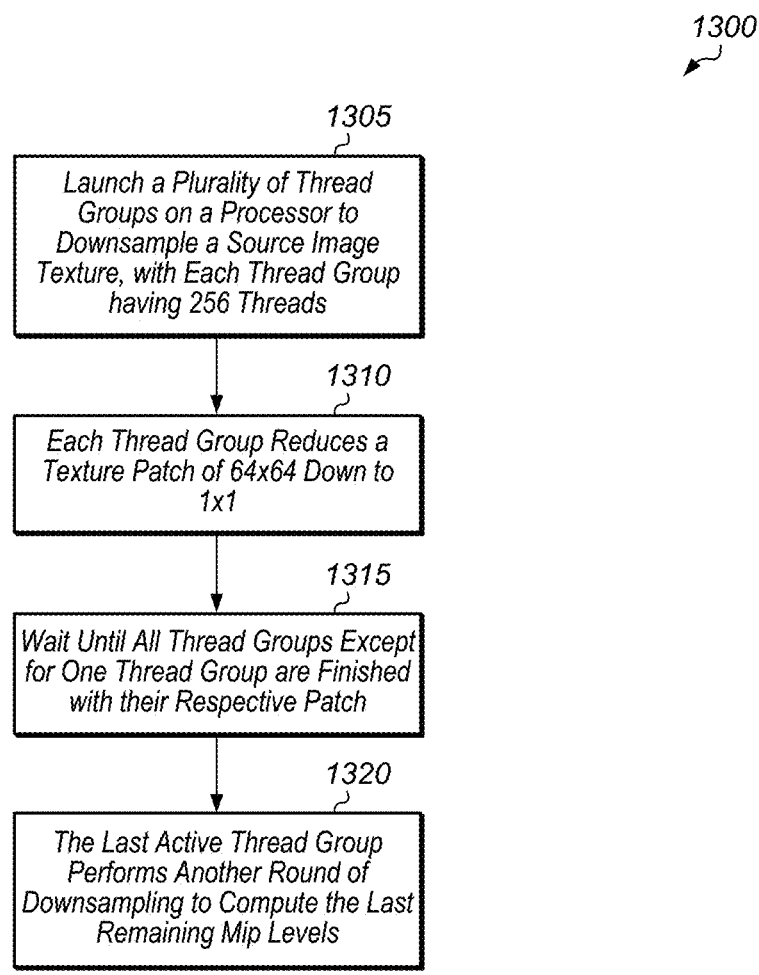
FIG. 13 is a generalized flow diagram illustrating one implementation of a method for thread groups processing patches of 64×64 texels.

Turning now to FIG. 13, one implementation of a method for thread groups processing patches of 64×64 texels is shown. A plurality of thread groups are launched on a processor (e.g., GPU 205 of FIG. 2) to downsample a source image texture, with each thread group having 256 threads (block 1305). Each thread group reduces a texture patch of 64×64 down to 1×1 (block 1310). This occurs with each thread group operating on a patch independently of the other thread groups operating on the other patches. In one implementation, each thread in a given thread group loads 16 texels from the texture. In one implementation, these 16 texels are loaded using 16 load instructions while in another implementation, 4 sample instructions with a bilinear filter are used to downsample 4 quads. As used herein, the term "quad" is defined as a 2×2 square of contiguous pixels.

The processor waits until all thread groups except for one thread group (i.e., a last active thread group) are finished with their respective patch (block 1315). This is the only global synchronization point used in the downsampling pass. Then, the last active thread group performs another round of downsampling to compute the last remaining mip levels (block 1320). After block 1320, method 1300 ends.

Figure 14:
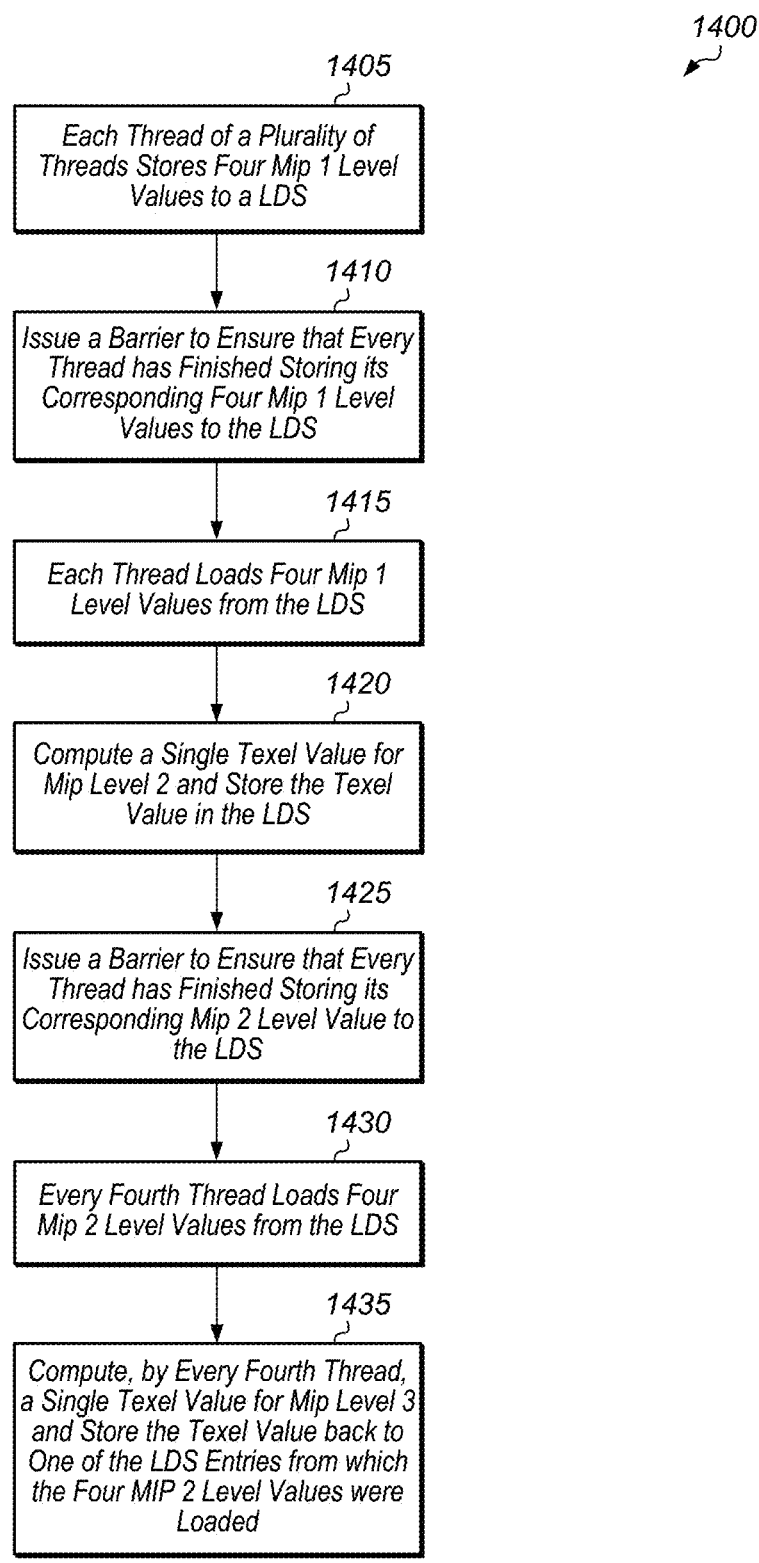
FIG. 14 is a generalized flow diagram illustrating one implementation of a method for computing mip levels 2 and 3.

Turning now to FIG. 14, one implementation of a method 1400 for computing mip levels 2 and 3 is shown. Each thread, of a plurality of threads, stores four mip 1 level values to a local data store (LDS) (block 1405). Next, a barrier is issued to ensure that every thread has finished storing its corresponding four mip 1 level values to the LDS (block 1410). Then, each thread loads four mip 1 level values from the LDS (block 1415). It is assumed for the purposes of this discussion that the four mip 1 level values stored by each thread are not contiguous texel values. Accordingly, for the purposes of this discussion, it is assumed that the threads will load a different set of texel values that form a contiguous quad in block 1415. Next, each thread computes a single texel value for mip level 2 and stores the texel value in the LDS (block 1420). Then, a barrier is issued to ensure that every thread has finished storing its corresponding mip 2 level value to the LDS (block 1425).

Next, every fourth thread loads four mip level 2 values from the LDS (block 1430). It is assumed that the four mip level 2 values form a quad within the mip level 2 grid. Then, every fourth thread computes and stores one mip level 3 value back to one of the entries from which the thread loaded the four mip level 2 values (block 1435). Any of the four entries can be used. After block 1435, method 1400 ends. It is noted that the remaining mip levels can be computed in a similar fashion to that described for method 1400.

Figure 15:
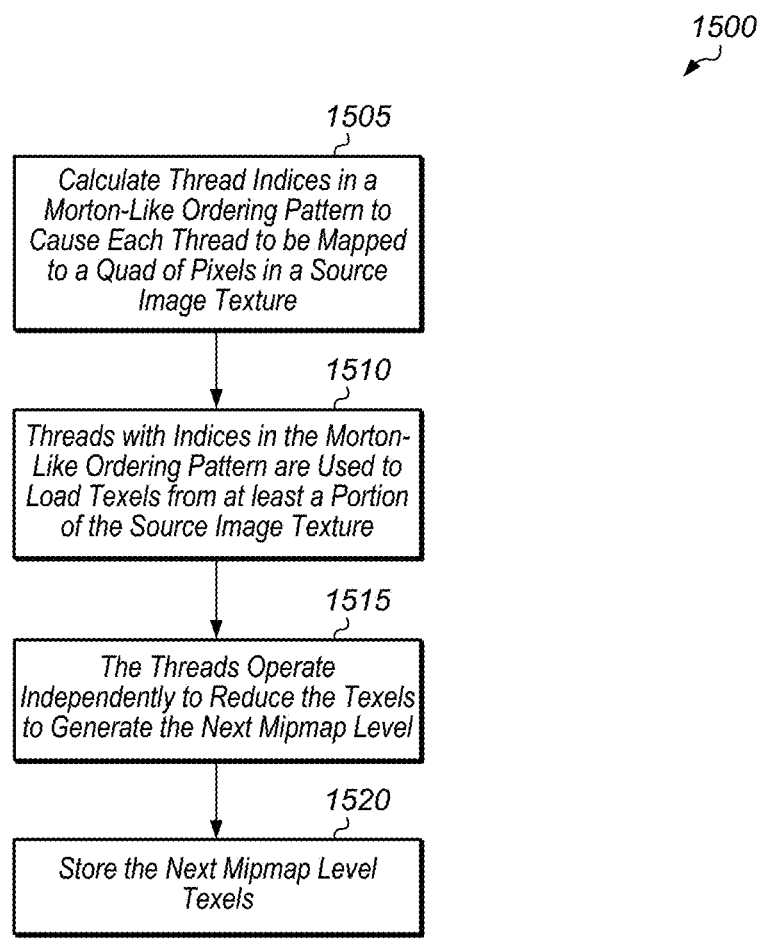
FIG. 15 is a generalized flow diagram illustrating one implementation of a method for mapping threads to texels using a Morton ordering pattern.

Turning now to FIG. 15, one implementation of a method 1500 for mapping threads to texels using a Morton ordering pattern is shown. A control unit (e.g., control unit 240 of FIG. 2) calculates thread indices in a Morton ordering pattern to cause each thread to be mapped to a quad of pixels in a source image texture (block 1505). The Morton ordering pattern is illustrated in FIG. 8. In one implementation, the source image texture is laid out in memory in the standard texture layout. The threads with indices in the Morton ordering pattern are used to load texels from at least a portion of the source image texture (block 1510). Next, the threads operate independently to reduce the texels to generate the next mipmap level (block 1515). Then, the next mipmap level texels are stored (block 1520). The texels can be stored to temporary buffers in a register space, to a LDS, or to another location. In some implementations, the threads calculate multiple mipmap levels and then store the texels for multiple mipmap levels before loading new texels. After block 1520, method 1500 ends.

Figure 16:
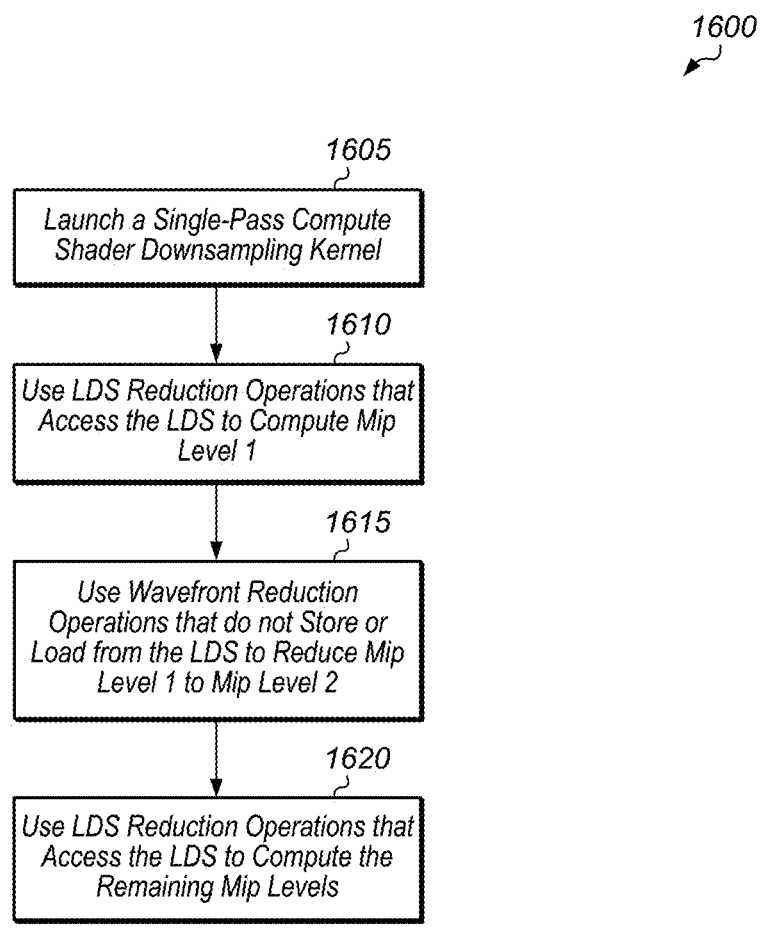
FIG. 16 is a generalized flow diagram illustrating one implementation of a method for alternating between LDS and wavefront reduction operations when executing a single-pass compute shader downsampling kernel.

Turning now to FIG. 16, one implementation of a method 1600 for alternating between LDS and wavefront reduction operations when executing a single-pass compute shader downsampling kernel is shown. A processor launches a single-pass compute shader downsampling kernel (block 1605). To compute mip level 1, the processor uses LDS reduction operations that access the LDS (block 1610). Next, to reduce mip level 1 to mip level 2, the processor uses wavefront reduction operations that do not store or load from the LDS (block 1615).

Examples of wavefront operations include data parallel processing (DPP) and LDS-permute operations. In one implementation, DPP operations include DPP8 operations for operating within any 8 threads and DPP16 operations for operating within any 16 threads. In this implementation, DPP8 operations support arbitrary swizzle operations while DPP16 operations support a predefined set of swizzle operations. The predefined set of swizzle operations include a permute of 4, a row shift left of 1-15 rows, a row shift right of 1-15 rows, mirroring threads within a half row (8 threads), and mirroring threads within a full row (16 threads). In one implementation, LDS-permute operations use LDS hardware for calculating the correct address without storing or loading from the LDS. Instead of accessing the LDS, the LDS-permute operations operate on data which is stored in temporary buffers in the register space. In other implementations, other types of wavefront operations besides DPP and LDS-permute operations can be supported. An advantage of using wavefront reduction operations is the ability to calculate the next mip level without accessing the LDS. This allows block 1615 of method 1600 to be overlapped with other pixel shader tasks that use the LDS without block 1615 interfering with these pixel shader tasks. After block 1615, to compute the remaining mip levels, the processor uses LDS reduction operations that access the LDS (block 1620). After block 1620, method 1600 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   an interface configured to access a memory storing a source texture; and
   a plurality of execution units comprising circuitry configured to:
   execute a plurality of thread groups;
   downsample, by each thread group of the plurality of thread groups in parallel, a different patch of the source texture to generate one or more mipmap levels for the source texture;
   maintain an indication as to how many of the plurality of thread groups have or have not completed execution;
   execute a last active thread group of the plurality of thread groups to compute remaining mipmap levels for the source texture, responsive to the indication indicating all other thread groups of the plurality of thread groups have completed downsampling a respective patch down to a single texel; and
   render pixels to be driven to a display based on one or more mipmap level texels.

2. The apparatus as recited in claim 1, further comprising a scheduling unit configured to launch the plurality of thread groups on the plurality of execution units responsive to receiving a single-pass downsampling kernel.

3. The apparatus as recited in claim 1, wherein the indication is a count.

4. The apparatus as recited in claim 3, wherein each thread group of the plurality of thread groups comprises a plurality of threads, and wherein the plurality of execution units is further configured to:
   execute each thread group to fetch a plurality of texels in a corresponding patch of the source texture; and
   downsample, by each thread of each thread group, a sub-patch of texels to compute texels at a first mipmap level and a second mipmap level.

5. The apparatus as recited in claim 4, wherein the plurality of execution units is further configured to:
   store, by each thread, one or more second mipmap level texels as a result of downsampling the sub-patch of texels; and
   execute the last active thread group to compute the remaining mipmap levels using a plurality of downsampled single texels generated from a plurality of patches of the source texture.

6. The apparatus as recited in claim 5, wherein the plurality of execution units is further configured to execute a subset of threads of each thread group to compute texels at a third mipmap level.

7. The apparatus as recited in claim 1, wherein the plurality of execution units is further configured to alternate between executing local data share (LDS) reduction operations and wavefront reduction operations when computing texels at a first mipmap level, a second mipmap level, and a third mipmap level.

8. A method comprising:
  executing, by circuitry of a plurality of execution units, a plurality of thread groups;
  downsampling, by each thread group of the plurality of thread groups in parallel, a different patch of a source texture to generate one or more mipmap levels for the source texture;
  maintaining an indication as to how many of the plurality of thread groups have or have not completed execution;
  executing a last active thread group of the plurality of thread groups to compute remaining mipmap levels for the source texture, responsive to the indication indicating all other thread groups of the plurality of thread groups have completed downsampling a respective patch down to a single texel; and
  rendering pixels to be driven to a display based on one or more mipmap level texels.

9. The method as recited in claim 8, further comprising launching the plurality of thread groups on the plurality of execution units responsive to receiving a single-pass downsampling kernel, wherein the single-pass downsampling kernel is a compute shader kernel.

10. The method as recited in claim 9, further comprising executing a subset of threads of each thread group to compute texels at a third mipmap level.

11. The method as recited in claim 10, further comprising executing the subset of threads to store third mipmap level texels to a subset of LDS entries which were used for loading second mip level texels.

12. The method as recited in claim 8, further comprising alternating between executing local data share (LDS) reduction operations and wavefront reduction operations when computing texels at a first mipmap level, a second mipmap level, and a third mipmap level.

13. The method as recited in claim 8, wherein the indication is a count, and the method further comprises:
  modifying the count each time a patch has been processed by a corresponding thread group; and
  executing the last active thread group to compute the remaining mipmap levels responsive to the count reaching a threshold.

14. The method as recited in claim 8, further comprising generating thread indices for fetching pixels based on a Morton ordering pattern.

15. A system comprising:
  a first processor comprising circuitry configured to dispatch a single-pass downsampling kernel to perform downsampling of a source texture; and
  a second processor comprising circuitry configured to:
    receive the single-pass downsampling kernel from the first processor, wherein the kernel comprises a plurality of thread groups;
    execute the plurality of thread groups;
    downsample, by each thread group of the plurality of thread groups in parallel, a different patch of the source texture to generate one or more mipmap levels for the source texture;
    maintain an indication as to how many of the plurality of thread groups have or have not completed execution;
    execute a last active thread group of the plurality of thread groups to compute remaining mipmap levels for the source texture, responsive to the indication indicating all other thread groups of the plurality of thread groups having have completed downsampling downsampled a respective patch down to a single texel; and
    render pixels to be driven to a display based on one or more mipmap level texels.

16. The system as recited in claim 15, wherein each thread group executes independently of other thread groups.

17. The system as recited in claim 16, wherein the second processor is further configured to execute a subset of threads of each thread group to compute texels at a third mipmap level.

18. The system as recited in claim 17, wherein the second processor is further configured to execute the subset of threads to store third mipmap level texels to a subset of LDS entries which were used for loading second mip level texels.

19. The system as recited in claim 15, wherein the second processor is further configured to alternate between executing local data share (LDS) reduction operations and wavefront reduction operations when computing texels at a first mipmap level, a second mipmap level, and a third mipmap level.

20. The system as recited in claim 15, wherein the indication is a count and the second processor is further configured to:
  modify the count each time a patch has been processed by a corresponding thread group; and
  execute the last active thread group to compute the remaining mipmap levels responsive to the count reaching a threshold.

* * * * *

UNITED STATES PATENT AND TRADEMARK OFFICE
CERTIFICATE OF CORRECTION

| | |
|---|---|
| PATENT NO. | : 11,915,337 B2 |
| APPLICATION NO. | : 17/182952 |
| DATED | : February 27, 2024 |
| INVENTOR(S) | : Kramer et al. |

It is certified that error appears in the above-identified patent and that said Letters Patent is hereby corrected as shown below:

In the Claims

Column 14, Claim 15, Line 20 & 21, please delete "having have completed downsampling downsampled a respective" and substitute -- have completed downsampling a respective --.

Signed and Sealed this
Thirtieth Day of July, 2024

*Katherine Kelly Vidal*
Katherine Kelly Vidal
*Director of the United States Patent and Trademark Office*